(12) United States Patent
Mahowald et al.

(10) Patent No.: US 8,330,725 B2
(45) Date of Patent: Dec. 11, 2012

(54) IN-PLANE KEYBOARD ILLUMINATION

(75) Inventors: Peter H. Mahowald, Los Altos, CA (US); Patrick Kessler, San Francisco, CA (US); Harold J. Welch, San Jose, CA (US)

(73) Assignee: Apple Inc., Cupertino, CA (US)

( * ) Notice: Subject to any disclaimer, the term of this patent is extended or adjusted under 35 U.S.C. 154(b) by 386 days.

(21) Appl. No.: 12/793,576

(22) Filed: Jun. 3, 2010

(65) Prior Publication Data

US 2011/0298716 A1 Dec. 8, 2011

(51) Int. Cl.
*G09G 5/00* (2006.01)

(52) U.S. Cl. ........................................ 345/170

(58) Field of Classification Search .................. 345/170, 345/168

See application file for complete search history.

(56) References Cited

U.S. PATENT DOCUMENTS

| | | | |
|---|---|---|---|
| 3,856,127 A | 12/1974 | Halfon et al. | |
| 5,581,251 A | 12/1996 | McRight et al. | |
| 2007/0034494 A1* | 2/2007 | Yurochko | 200/310 |
| 2011/0248838 A1* | 10/2011 | Krahenbuhl et al. | 345/168 |

FOREIGN PATENT DOCUMENTS

| | | |
|---|---|---|
| CN | 201159880 Y | 12/2008 |
| GB | 2 285 518 | 7/1995 |
| KR | 10-2006-0120512 | 11/2006 |

OTHER PUBLICATIONS

Sharp et al., "Optical Keyboard," IP.com PriorArtDatabase, Mar. 1, 1963.

* cited by examiner

*Primary Examiner* — Kevin M Nguyen
(74) *Attorney, Agent, or Firm* — Dorsey & Whitney LLP

(57) ABSTRACT

A computer keyboard includes a plurality of keys arranged in a pattern contained within a plane, a webbed structure defining openings for each of the keys, an illumination source, and one or more light pipes positioned along the webbed structure and arranged to deliver light from the illumination source to the keys, wherein each of the keys is illuminated thereby. Although the keys have the appearance of being backlit similar to traditional illuminated keyboards, the illumination source is actually located along at least one side of and within the same plane as the pattern of keys, rather than beneath the keys. The keyboard can thus be made thinner in such arrangements where the illumination source does not need to be located beneath the keys.

26 Claims, 6 Drawing Sheets

IN-PLANE KEYBOARD ILLUMINATION

TECHNICAL FIELD

The present invention relates generally to personal computing devices, and more particularly to illuminated keyboards for use with such computing devices.

BACKGROUND

Keyboards are one of the most common and popular types of user input devices for personal computers and other similar devices. A typical computer keyboard includes numerous keys that enable a user to enter a variety of information and inputs quickly, as well as various subsystems designed to convert keystrokes to electronic signals and deliver such signals to an associated computer. Modern keyboards can also include a number of extra features and improvements to facilitate user interaction. One such feature that has been found to be useful for many users is the ability to illuminate the keyboard and/or various keys thereof, such as for typing in conditions of low light or darkness.

In many instances, keyboards can be illuminated from above by a special light in darkness or low light conditions. For example, some laptop computers come equipped with a dedicated LED or other light that is located along the upper display frame, and that is directed toward lighting the keyboard when activated. In still other arrangements, illuminated keyboards can be equipped with a general backlight arrangement, with one or more illumination sources being located beneath the various keys. Such keyboards can include, for example, a number of LEDs spaced apart beneath the keys and arranged to distribute light upwards between keys, with suitable spacing between the keys being employed to facilitate such a result.

While convenient, both of the foregoing types of keyboard illumination do have various drawbacks. In the case of lighting from above, such lighting is subject to interfering objects, is often non-uniform, and can be less aesthetically pleasing than backlighting for many users. Although backlighting can often be more aesthetically pleasing, such arrangements typically require one or more illumination sources to be located beneath the various keys. Although this may not be an issue in some cases, the addition of such light sources does increase the thickness of the keyboard to some degree. In various applications where thin and sleek is desired, such as in newer laptop designs, for example, the addition of even a thin illumination backlighting layer to the computer keyboard can be somewhat detracting.

While many designs and techniques used with respect to illuminated keyboard assemblies have generally worked well in the past, there is always a desire to provide further designs and techniques for illuminated keyboards. In particular, what is desired are improved keyboard assemblies that provide for an aesthetic backlighting type illumination of the keyboard in low light conditions without sacrificing any thickness in the keyboard.

SUMMARY

It is an advantage of the present invention to provide a keyboard for a personal computer, laptop, or other similar device, with such a keyboard being illuminated yet as thin as possible. This can be accomplished at least in part through the use of alternative keyboard lighting arrangements that utilize illumination sources in the same plane as the keyboard keys, with the light therefrom being delivered to illuminate the keys by way of light pipes located within or alongside a webbed structure that runs between the keys.

In some embodiments of the present invention, a keyboard includes a plurality of keys arranged in a pattern contained within a plane, a webbed structure surrounding the keys and defining openings for each of the keys, an illumination source located along at least one side of and within the same plane as the pattern of keys, and one or more light pipes positioned along the webbed structure and arranged to deliver light from the illumination source to the keys, wherein each of the plurality of keys is illuminated thereby. Each of the plurality of keys can include a keycap and an actuating component, such that the key can be depressed by a user.

In further embodiments of the present invention, a computing device can include an outer housing, a processor disposed within the outer housing, a display coupled to the processor and adapted to provide a display output from the processor to a user, and a keyboard such as that which is recited above. In some embodiments, the computing device can be a laptop computer.

In various detailed embodiments, which can include the full computing device or just the keyboard as recited above, the webbed structure can be formed from metal, such as aluminum, while in other embodiments the webbed structure can be formed from a light transmitting material, such as acrylic. Thin fiber optic cables can serve to function as some or all of the light pipes. In some embodiments, at least a portion of the light pipes can be embedded within the webbed structure, and in some embodiments, at least a portion of the light pipes can run alongside, atop or beneath the webbed structure. In various embodiments, one or more light pipes can include a plurality of features that function to direct light within the keyboard. Such features can include, for example, pyramids, bumps, surface roughness and paint worked within or distributed on one or more surfaces of the light pipes. The illumination source can include, for example, one or more LEDs.

In various detailed embodiments, at least one of the keycaps includes a legend thereon, with the legend adapted to be backlit by light delivered from one or more light pipes. Such legends can be, for example, single letters, numerals, punctuation marks, function designations and the like. In some embodiments, all of the keycaps can have such backlit legends disposed thereupon. Various keycaps can include a top surface and one or more side walls extending downward therefrom to define a hollow inner region beneath the keycap, wherein the top surface and one or more side walls are substantially opaque with the exception of the backlit legend, and wherein at least one light pipe backlights the legend by delivering light to shine therethrough. In some instances, light to backlight the legend is delivered beneath one of the side walls into the hollow inner region, while in other cases light to backlight the legend is delivered through a transparent or translucent portion along the bottom of a keycap sidewall into the hollow inner region. In some embodiments, the keycap body is clear and receives the light from the in-plane illumination into the edge of the key, with the legend on top of the clear key or imbedded within it.

In further detailed embodiments, the openings in the webbed structure are larger than the respective keys, such that gaps exist between the webbed structure and the plurality of keys. In such embodiments, light from one or more light pipes can be delivered upward through the gaps to illuminate the keyboard. In some embodiments where the webbed structure is formed from a light transmitting material, one or more of the light pipes can be integrally formed within said light transmitting material. In such embodiments, an opaque layer can be situated atop the webbed structure, such that the delivery of light to illuminate the keyboard is more readily controlled. In some embodiments, the light pipes can include a plurality of primary light pipes situated between rows of keys and running lengthwise along the keyboard and a plurality of secondary light pipes branching off from one or more of said plurality of primary light pipes and running up and down between adjacent keys.

In still further embodiments of the present invention, various methods of illuminating a keyboard are provided. Process steps can include arranging a light source along one or more sides of and within the same plane as a plurality of keys arranged in a pattern, wherein each of said plurality of keys includes a keycap and an actuating component, extending one or more light pipes from the light source and between at least some of the plurality of keys, wherein such light pipes do not run beneath any of the keys, delivering light from the light source through the light pipes to the keys, and illuminating the keys with the delivered light. Various details of such methods can include one or more of the features from any of the foregoing embodiments and in any combination, as may be desired.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed in-plane illuminated keyboard. These drawings in no way limit any changes in form and detail that may be made to the invention by one skilled in the art without departing from the spirit and scope of the invention.

DETAILED DESCRIPTION

Figure 1:
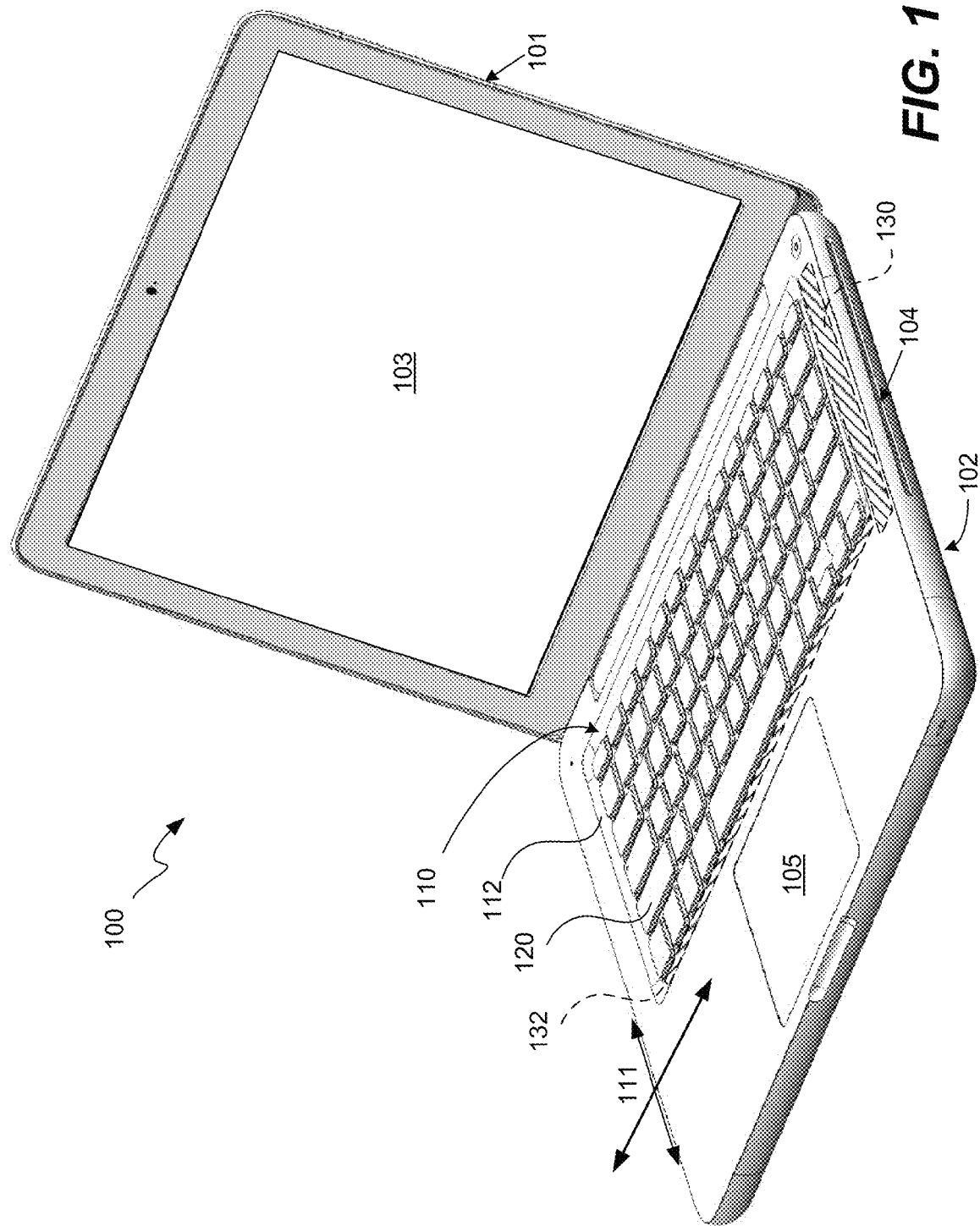
FIG. 1 illustrates in front perspective view an exemplary laptop computer having a built-in keyboard according to one embodiment of the present invention.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The present invention generally relates in various embodiments to an illuminated keyboard that can be used as an input device for a personal computer, such as a laptop computer. Such an illuminated keyboard generally includes a built-in illumination source that is located within the same plane as the pattern defined by the keyboard keys, with light being delivered from the illumination source to the keys by way of one or more light pipes. Although the following specific embodiments have been described with respect to keyboards integrated with laptop computers, it will be readily appreciated that the keyboard illumination assemblies and techniques disclosed herein can be utilized on stand-alone keyboards for personal computers. Alternatively, the keyboard illumination assemblies and techniques disclosed herein can also be used with other computing and electronic devices that utilize keyboard assemblies, such as PDAs, cellular telephones, media players and the like, as well as automotive, medical, and various other devices. Further alternative embodiments will be readily appreciated by those skilled in the art.

The present invention is adapted to illuminate the keyboard by providing lighting in the same plane as the keyboard keys to result in a backlit effect on the keys. In particular, such light can be delivered via a webbed structure that surrounds each key but is not part of the keycaps or keys itself. One or more light pipes are positioned alongside or within the webbed structure, and can actually replace part of the web material. The light pipes can span up and down between keys and/or from left to right below each row of keys. Each light pipe ends at an illumination source along a side of the pattern of keys, such as an LED. Each light pipe has features, such as pyramids, bumps, surface roughness and/or paint, which direct or extract the light from the light pipe at various locations. Each light pipe can be placed closer to the user than the row of keys that it lights, so the lighting is directed away from the user.

Referring first to FIG. 1, an exemplary laptop computer having a built-in keyboard is shown in front perspective view. Laptop computer 100 can include an upper housing 101, bottom housing 102, display 103, optical disc drive 104, touchpad 105, keyboard 110, and one or more internal processors (not shown), among various other components. Keyboard 110 can include an upper plate or webbed structure 112 surrounding a plurality of individual keys 120 that generally arranged in a pattern, with the pattern of keys all residing within the same plane 111. An illumination source 130 having one or more light pipes 132 extending therefrom can be situated within or alongside the webbed structure 112, with the illumination source and light pipe(s) also residing within plane 111.

Figure 2:
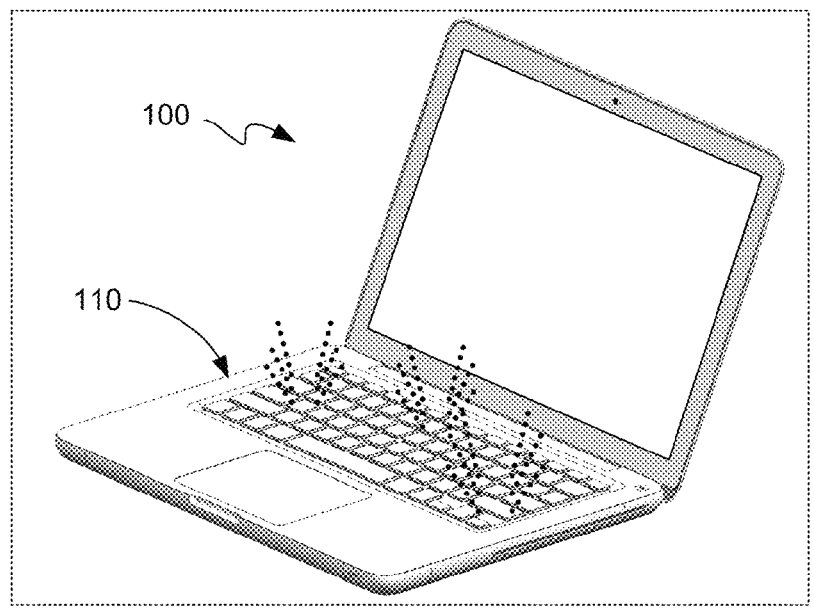
FIG. 2 illustrates in front perspective view the exemplary laptop computer of FIG. 1 with its keyboard being illuminated in a backlit type manner according to one embodiment of the present invention.

In various embodiments, the webbed structure 112 can be composed of aluminum or any other metal or suitable material, and can have various openings therethrough to accommodate keycaps for each of the keys. That is, the openings in the webbed structure can be larger than the respective keys, such that gaps exist between the webbed structure and the plurality of keys. Such gaps can result in light from one or more light pipes being delivered upward therethrough to illuminate directly the various keys and/or their perimeters, which can aid in locating the keys when there are multiple legends per key, for example Continuing with FIG. 2 the exemplary laptop computer of FIG. 1 is shown in front perspective view with its keyboard being illuminated in a backlit type manner according to one embodiment of the present invention. As shown, the keyboard 110 of laptop computer 100 has light emanating from beneath and/or between its keys. This light can actually be delivered by way of one or more light pipes running between the keys, such as by being embedded in the webbed structure between the keys. This can give the appearance of a backlit keyboard without the need for an actual backlight underneath the keys. Of course, the use of an actual backlight under the keys requires a thicker keyboard; thus, not needing a backlight thereunder results in a thinner keyboard. In addition to light coming out from between the keys, some light can be directed underneath one or more keycaps to illuminate various legends on the top surfaces of the keys in a backlighting type manner.

Figure 3:
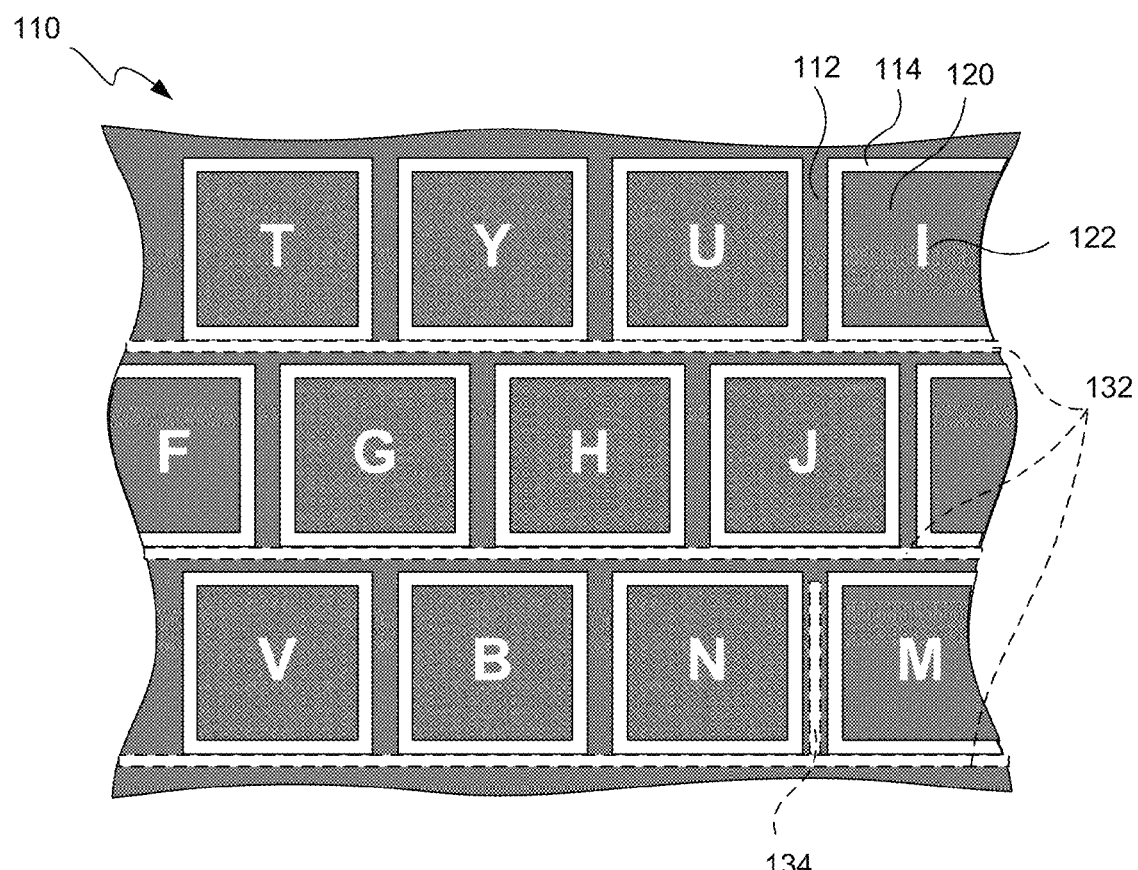
FIG. 3 illustrates in top plan close up view a cutaway portion of the keyboard from the exemplary laptop computer of FIG. 1 according to one embodiment of the present invention.

FIG. 3 illustrates in top plan close up view a cutaway portion of the keyboard from the exemplary laptop computer of FIG. 1 according to one embodiment of the present invention. Illuminated keyboard 110 can have a plurality of keys 120, with one or more keys having a legend 122 thereon. Such legends can be, for example, letters, numbers, symbols, functions, directions and the like, among other possibilities, as will be readily appreciated. The various keys 120 can be spaced apart in a pattern and surrounded individually and collectively by a webbed structure 112, such that gaps 114 are formed between the keys and webbed structure. These gaps 114 can serve to allow the upward escape of light delivered by light pipes so as to illuminate the keys thereby.

One or more primary light pipes 132 can run laterally from side to side along the keyboard. In some embodiments, a light pipe can extend between each row of keys. Each primary light pipe 132 can extend from an illumination source, which can be located to one side of the pattern of keys. In addition, one or more secondary light pipes 134 can be arranged to branch off from a primary light pipe 132, such that light can be directed and delivered in further directions throughout the keyboard. Although only one secondary light pipe is shown for purposes of simplicity in illustration, it will be readily appreciated that such secondary light pipes 134 can extend in a similar manner between some or all of the keys. Alternatively, such secondary light pipes can extend between every other pair of keys, and can be adapted to shine light in multiple directions. In some embodiments, such secondary light pipes might not be used.

Figure 4:
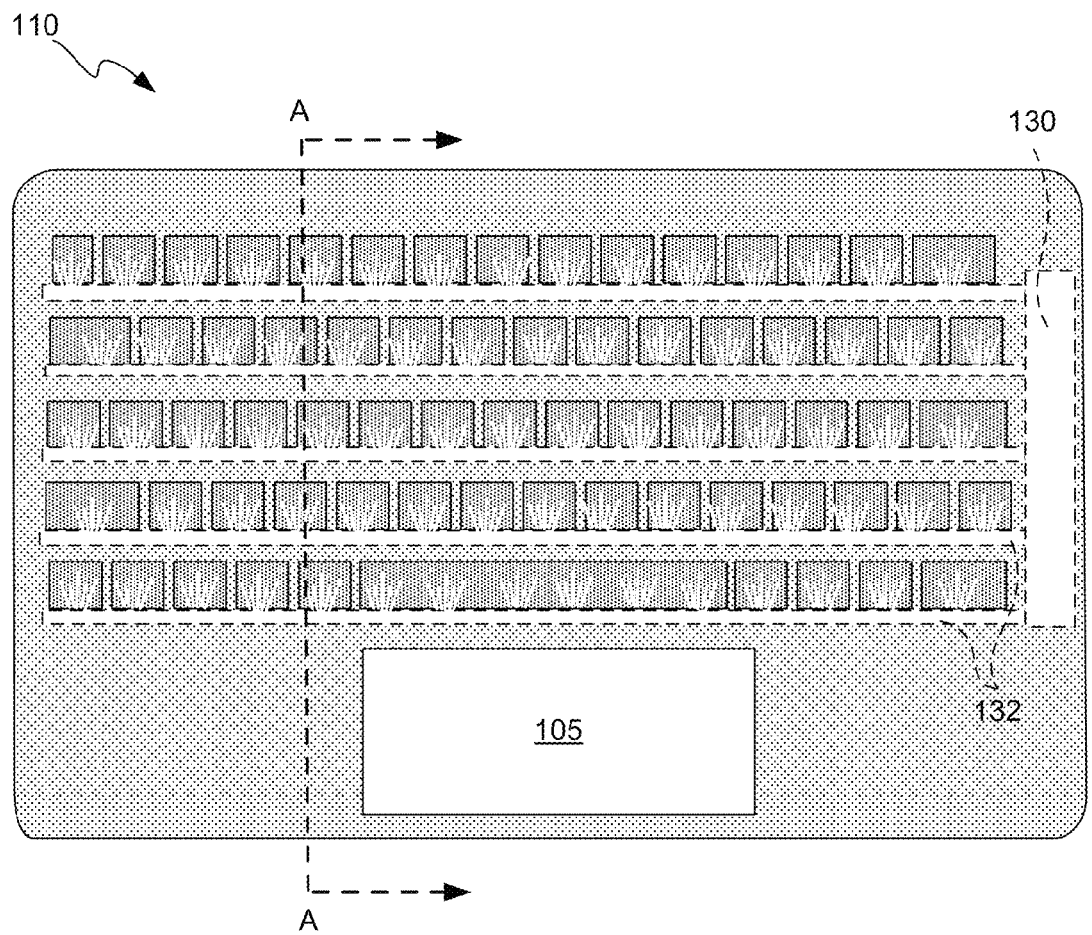
FIG. 4 illustrates in top plan view an exemplary illuminated keyboard according to one embodiment of the present invention.

Turning next to FIG. 4, an exemplary illuminated keyboard is illustrated in top plan view. Illuminated keyboard 110 can be situated above a track pad 105, for example, and can include a plurality of keys arranged in a pattern, with such a pattern including a number of rows. Although 5 rows of keys are shown, it will be readily appreciated that more or fewer rows of keys may be used. A light or illumination source 130 is located beneath, alongside or embedded within a webbed structure, with the various keys extending upward through openings in the webbed structure. A plurality of light pipes 132 extend from the illumination source 130 and are also located beneath, alongside or embedded within the webbed structure. The light pipes are arranged to deliver light from the light source to the various keys such that the keys can be illuminated. As noted above, illumination of keys can be accomplished by way of shining light from the light pipes into the openings between the keys and the webbed structure, and/or by directing light from the light pipes into or beneath the keycaps so as to illuminate legends on the keys themselves in a backlit type manner.

Light pipes 132 can be embedded within the webbed structure in specially created grooves or cavities, for example, which grooves or cavities can help to direct the light as it is emitted from the light pipes. In some embodiments, light from the light pipes does not travel through or is not emitted from the webbed structure material itself. This can be accomplished by way of the webbed structure being formed from a metallic material and/or by painting or otherwise applying a finish or coating to the webbed structure.

As shown, light pipes 132 can be arranged to run right alongside the bottom of each row of keys. This arrangement can advantageously result in light being emitted from the light pipes such that the keys are illuminated, and that light shining into or near the eyes of the user is minimized or eliminated. In fact, FIG. 4 depicts light being emitted onto each of the various keys and away from where the user would typically be located with respect to the keyboard. Such a directional aspect to the keyboard illumination can be accomplished by way of the geometry in the way the light pipes are embedded in the webbed structure, by way of various features in the light pipes, or a combination thereof.

In some embodiments, the light pipes can be comprised of a fiber optic material, polycarbonate, acrylic, or any other material that is well suited for light pipe formation. Light pipes for use in such illuminated keyboard applications can have a diameter of about one millimeter, although larger or smaller diameter light pipes might also be used as may be appropriate. In some embodiments, a single light or illumination source 130 can exist to either side, top or bottom of the key pattern, while in some embodiments a plurality of light sources can be used. In one multi-light source embodiment, for example, six separate LEDs can be used, with a single light pipe extending laterally from each LED—thus resulting in one illumination source and one light pipe for each row of keys. In another exemplary embodiment, a plurality of light pipes can join in a manifold to the side of the pattern of keys, which manifold has light delivered into it by a single more powerful but lower cost LED/PCB architecture.

Figure 5:
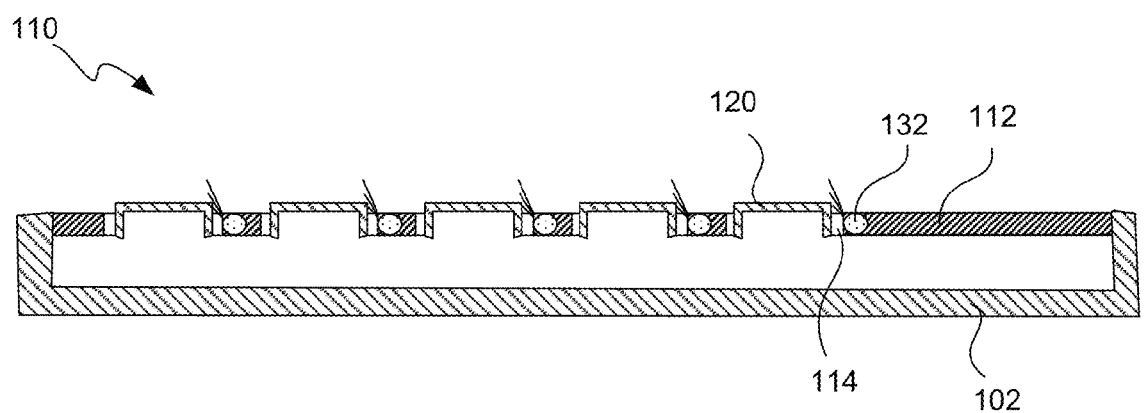
FIG. 5 illustrates in side cross-sectional view the keyboard from FIG. 4 according to one embodiment of the present invention.

Continuing with FIG. 5 the keyboard from FIG. 4 is illustrated in side cross-sectional view along section A-A of FIG. 4. Again, although only five rows of keys are shown, it will be appreciated that more or fewer rows can exist. As shown, the outer housing 102 of the device supports webbed structure 112 and a plurality of keys 120. The keys 120 can include keycaps and various underlying actuating mechanisms and components, details for which are well known by those skilled in the art and are not provided herein for purposes of simplicity. Gaps 114 exist between each key 120 and the webbed structure 114, such that light can be delivered by light pipes 132 to exit at such locations and illuminate the keys thereby. Again, the webbed structure and light pipes can be designed such that light is directed to and escapes and designed locations and directions, in order to maximize the illumination of the keys with a minimal amount of light. For example, the geometry the grooves in the webbed structure that embed the light pipes can have openings that direct the light upward and onto the keys and away from the user at specific locations.

In addition, various features in the light pipes can be employed to direct and manipulate the delivery and direction of the light. Typical light pipes operate on total internal reflection ("TIR") principles, such that light typically only escapes at distal ends or locations of feature or imperfections in the light pipes. Such features can include, for example, pyramids, bumps, grooves, scratches, surface roughness, paint and the like. Some of these items or features can be located on the surfaces of the light pipes, while others can be internal. Various features can be used to divert light where desired, such as from a primary light pipe into a secondary light pipe, for example. Such features can also be used to permit light to escape in a directed manner at select locations, such as at the location of each key along the light pipe. Further details of manipulating and delivering light by way of features in light pipes will be readily appreciated by those skilled in the art, and all such features and techniques can be used with the systems disclosed herein to aid in delivering light from a light source to the exact locations where illumination is desired.

Figure 6:
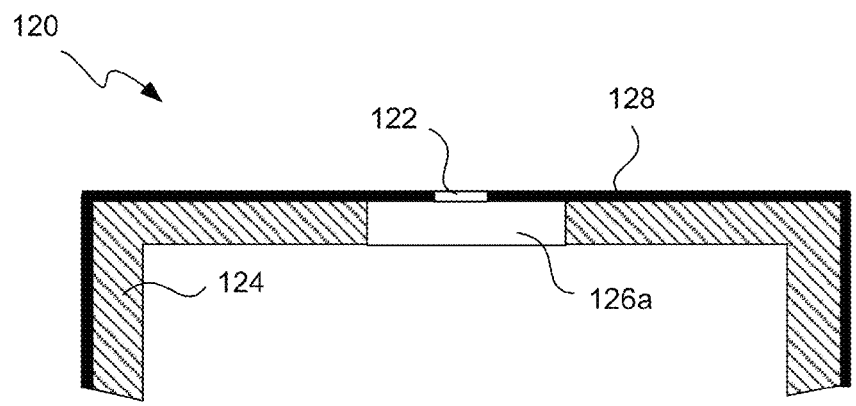
FIG. 6 illustrates in side cross-sectional view an exemplary keycap according to one embodiment of the present invention.

Moving on to FIG. 6, an exemplary keycap according to one embodiment of the present invention is shown in side cross-sectional view. Keycap 120 includes a legend 122 on a top surface thereof and a plastic or other sturdy material 124 that makes up the top surface and one or more key sidewalls. Material 124 can be translucent or transparent in nature, or can be an opaque material. In the event, that material 124 is opaque, an optional window region 126a can exist just below the legend 122. A thin layer of paint 128 or ink can be distributed across the outside surfaces of the key 120. Such a paint layer 128 can serve as a contrast to the legend 122 when the legend is illuminated by way of backlighting. Further layers, such as adhesive, primer, or other secondary layers may also exist, as may be desired.

Figure 7A:
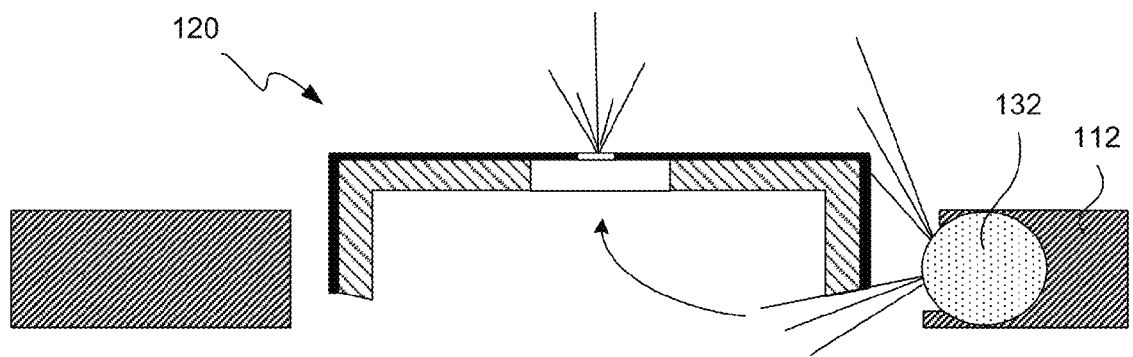
FIG. 7A illustrates in side cross-sectional view the exemplary keycap of FIG. 6 installed into an illuminated keyboard according to one embodiment of the present invention.

Continuing with FIG. 7A the exemplary keycap of FIG. 6 is shown in side cross-sectional view as being installed into an illuminated keyboard according to one embodiment of the present invention. Keycap 120 is positioned within an opening of an associated webbed structure 112, which webbed structure partially encloses a light pipe 132 running therethrough. As noted above, the manner in which the light pipe 132 is enclosed within the webbed structure can result in light escaping therefrom in a particularly desired directed manner. Various scratches, grooves and/or other features on the light pipe 132 can result in light escaping from and being directed upward along the sides and toward the top of the key, as shown. In addition, light can also be allowed to escape from and be directed away from light pipe 132 such that it travels beneath a side wall of the keycap and into a hollow inner region of the key. This light is then able to travel up through the clear material or window in the upper surface of the keycap to backlight the legend on the top surface of the key.

Figure 7B:
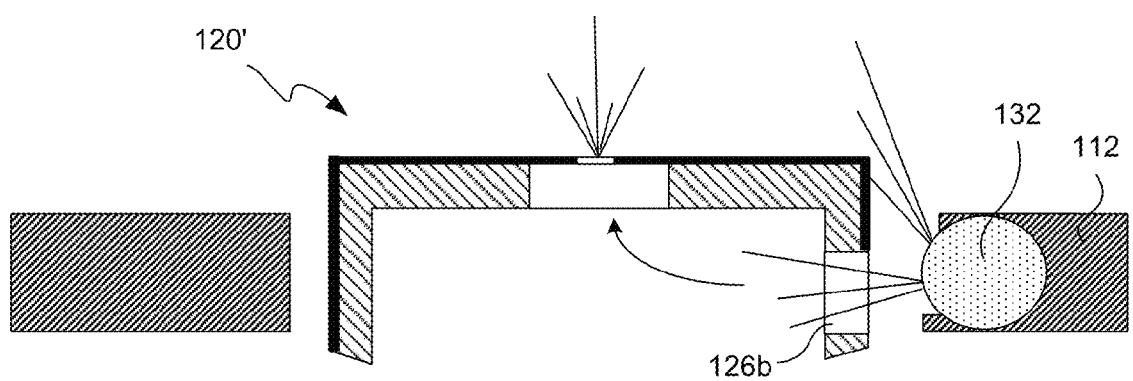
FIG. 7B illustrates in side cross-sectional view an alternative exemplary keycap installed into an illuminated keyboard according to one embodiment of the present invention.

As another example, FIG. 7B illustrates in side cross-sectional view an alternative exemplary keycap installed into an illuminated keyboard. In this particular alternative embodiment, keycap 120' can have a least a bottom portion of one side wall formed from a transparent or translucent material, such as that shown for optional window region 126b. In some embodiments, the keycap material may be clear to begin with, such that the formation of a window region can be accomplished by leaving a suitable opening when the key surfaces are painted. As shown, light can be directed from the light pipe 132, through the transparent or translucent bottom wall portion of the keycap 120' into the hollow inner region of the key. As in the above example, this light is then able to travel up through the clear material or window in the upper surface of the keycap to backlight the legend on the top surface of the key.

Figure 8A:
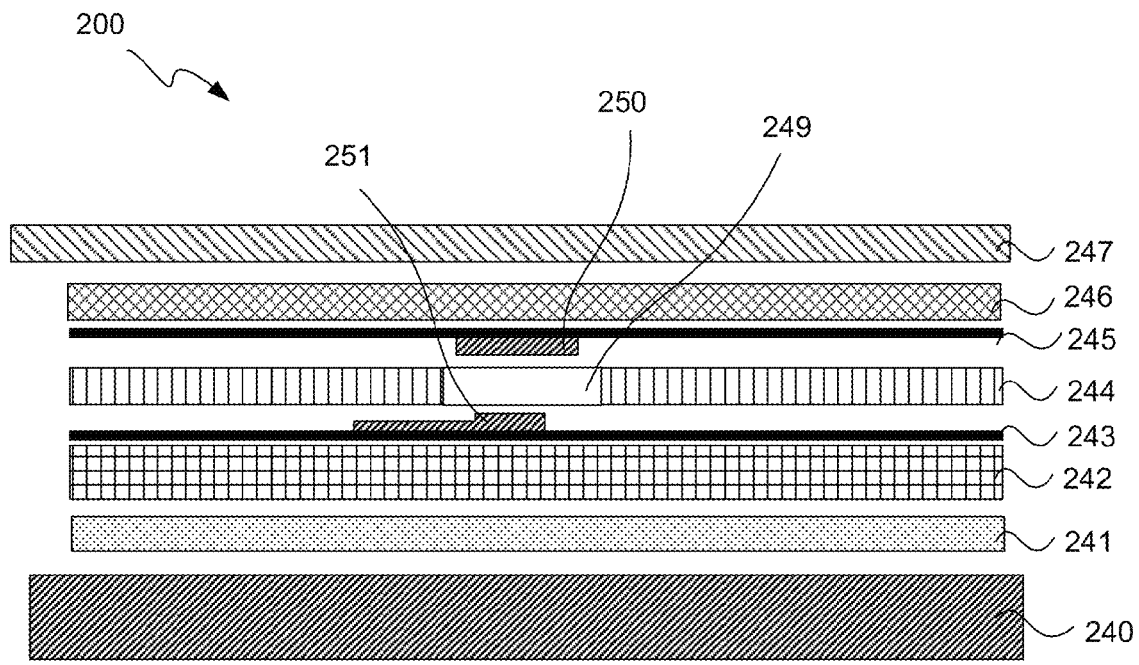
FIG. 8A illustrates in exploded side cross-sectional view a partial thin keyboard having a built-in backlighting system according to one embodiment of the present invention.

FIG. 8A illustrates in exploded side cross-sectional view a partial thin keyboard having a built-in backlighting system according to one embodiment of the present invention. Partial keyboard 200 includes a number of layers, and is intended to provide an illuminated keyboard having full functionality in as thin a structure as possible. The various layers of keyboard 200 can include a feature plate 240, which can provide support and also serve as a light reflector. This layer 240 can have a thickness of about 0.20 mm. Atop layer 240 is a membrane bottom flex layer 241, which can have a thickness of about 0.05 mm. Atop layer 241 is a light guide panel layer 242, which can have a thickness of about 0.40 mm. An ink layer 243 has a negligible thickness, after which a mask and spacer layer 244 can have a thickness of about 0.05 mm. Another ink layer 245 has a negligible thickness, after which a membrane top flex layer 246 can have a thickness of about 0.075 mm. Finally, a rubber dome sheet layer 247 can have a thickness of about 0.05 mm. In all, the total thickness of keyboard stack 200 can be about 0.675 mm.

The light guide panel layer can be arranged to provide light throughout the keyboard, and the feature plate can be arranged to reflect the provided light upward to maximize its effect. Each of the membrane flex layers can include various electrical traces, such as top trace 250 on layer 246 and bottom trace 251 on layer 242. The mask and spacer layer 244 can have various openings 249 therethrough that allow such top and bottom traces to contact each other when the top of the keyboard is depressed by a user. Such a contact then results in a signal that is processed and provided as an input to an associated computing device, as will be appreciated.

Figure 8B:
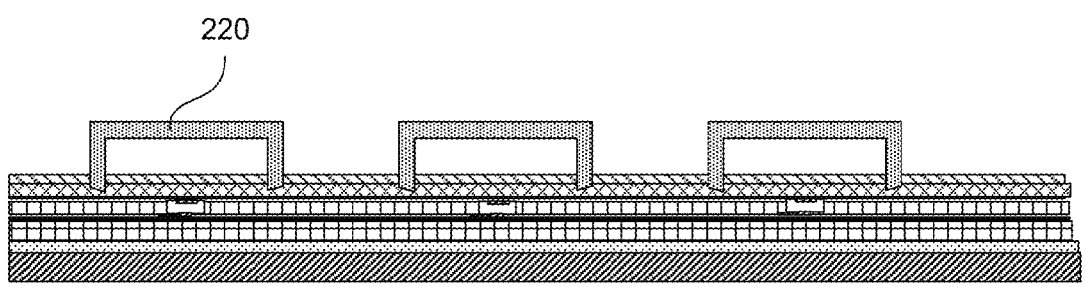
FIG. 8B illustrates in side cross-sectional view the partial thin keyboard of FIG. 8A as assembled with keycaps installed thereon according to one embodiment of the present invention.

FIG. 8B illustrates in side cross-sectional view the partial thin keyboard of FIG. 8A as assembled with keycaps installed thereon according to one embodiment of the present invention. As shown, various keycaps 220 can be situated atop the assembled keyboard stack 200 of FIG. 8A, so as to help the user and facilitate the depressing of the keyboard at the appropriate locations above an electrical trace pair. The exact design, nature and appearance of such keycaps 220 can vary widely, and such keycaps can be overlaid, glued, otherwise fastened, or integrally formed with the keyboard 200, as will be readily appreciated.

Figure 9:
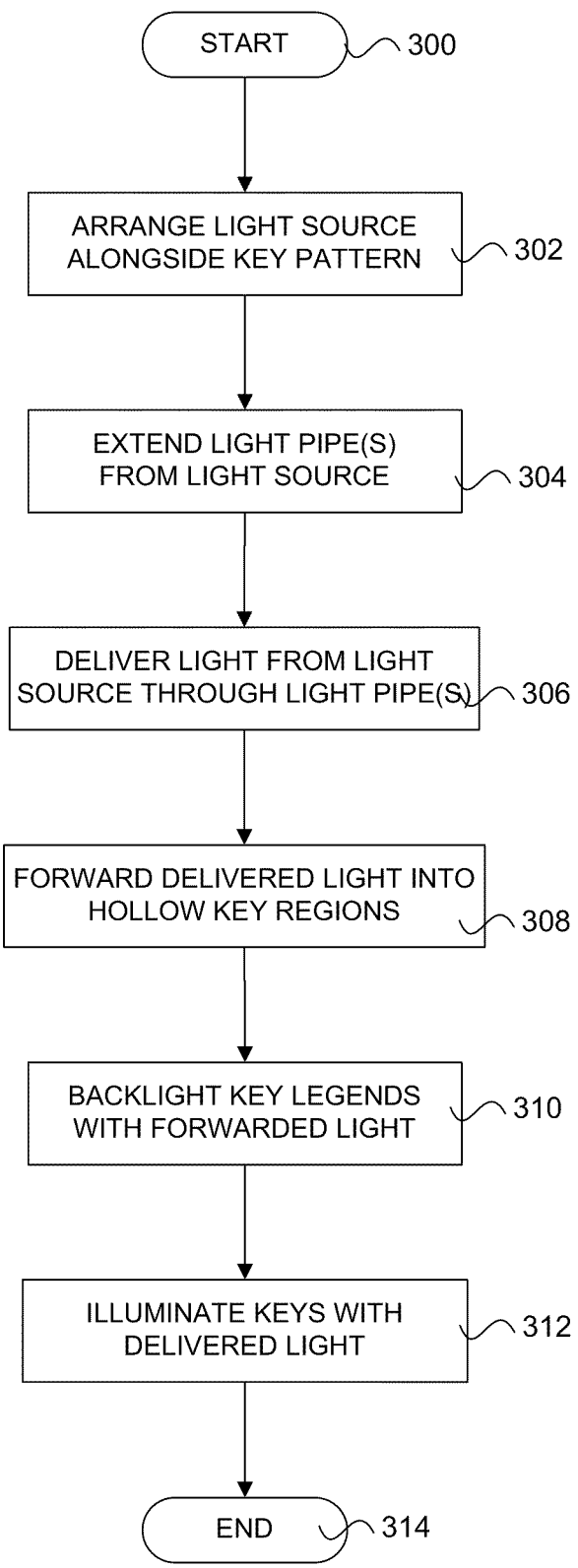
FIG. 9 provides a flowchart of an exemplary method of illuminating a keyboard according to one embodiment of the present invention.

Turning lastly to FIG. 9, a flowchart of an exemplary method of illuminating a keyboard is provided. It will be readily appreciated that the various steps set forth can be implemented as desired, and that some steps may be removed, while others not shown may be added. Furthermore, the order of the various steps may be changed as may be appropriate for a given application, as will be readily appreciated. For example, steps 304 and 302 can be reversed or conducted in parallel, as will be readily appreciated.

After a start step 300, a light source can be arranged alongside a pattern of keys at process step 302. One or more light pipes can be extended from the light source at process step 304. At subsequent step 306, light can then be delivered from the light source and through the light pipes. The delivered light can then be forwarded into the hollowed key regions at process step 308, where the key legends are backlit with the light at process step 310. In addition, the keys can also be illuminated from a side or surrounding manner through the gaps between keys at process step 312. The method then ends at end step 314.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A keyboard, comprising:
    a plurality of keys arranged in a pattern contained within a plane, wherein each of said plurality of keys includes a keycap and an actuating component;
    a webbed structure surrounding said keys and defining openings for each of said plurality of keys;
    an illumination source located along at least one side of and within the same plane as said pattern of keys; and
    one or more light pipes positioned along said webbed structure and arranged to deliver light from said illumination source to said plurality of keys, wherein each of said plurality of keys is illuminated thereby.

2. The keyboard of claim 1, wherein said webbed structure is formed from metal.

3. The keyboard of claim 1, wherein at least a portion of said one or more light pipes is embedded within said webbed structure.

4. The keyboard of claim 1, wherein said one or more light pipes include a plurality of features that function to direct light within said keyboard.

5. The keyboard of claim 4, wherein said plurality of features are selected from the group consisting of pyramids, bumps, surface roughness and paint.

6. The keyboard of claim 1, wherein at least one of said keycaps includes a legend thereon, wherein said legend is adapted to be backlit by light delivered from said one or more light pipes.

7. The keyboard of claim 6, wherein said at least one keycap includes a top surface and one or more side walls extending downward therefrom to define a hollow inner region beneath the keycap, wherein said top surface and one or more side walls are substantially opaque with the exception of said legend, and wherein at least one of said light pipes backlights said legend by delivering light to shine therethrough.

8. The keyboard of claim 7, wherein light to backlight said legend is delivered beneath one of the side walls into the hollow inner region.

9. The keyboard of claim 7, wherein at least a bottom portion of one sidewall is transparent or translucent, and wherein light to backlight said legend is delivered through said transparent or translucent portion into the hollow inner region.

10. The keyboard of claim 1, wherein the openings in said webbed structure are larger than the respective keys such that gaps exist between the webbed structure and the plurality of keys, and wherein light from said one or more light pipes is delivered upward through said gaps to illuminate the keys.

11. The keyboard of claim 1, wherein said one or more light pipes includes a plurality of primary light pipes situated between rows of keys and running lengthwise along the keyboard and a plurality of secondary light pipes branching off from one or more of said plurality of primary light pipes and running up and down between adjacent keys.

12. The keyboard of claim 1, wherein said webbed structure is formed from a light transmitting material, and wherein said one or more light pipes are integrally formed within said light transmitting material.

13. The keyboard of claim 12, further including:
    an opaque layer situated atop said webbed structure, said opaque layer being adapted to control the delivery of light to illuminate said keyboard.

14. A computing device, comprising:
    an outer housing;
    a processor disposed within said outer housing;
    a display coupled to said processor and adapted to provide a display output from the processor to a user; and
    a keyboard assembly coupled to said processor and adapted to deliver an input from the user to the processor, said keyboard assembly including
        a plurality of keys arranged in a pattern contained within a plane, wherein each of said plurality of keys includes a keycap and an actuating component;
        a webbed structure surrounding said keys and defining openings for each of said plurality of keys;
        an illumination source located along at least one side of and within the same plane as said pattern of keys; and
        one or more light pipes positioned along said webbed structure and arranged to deliver light from said illumination source to said plurality of keys, wherein each of said plurality of keys is illuminated thereby.

15. The computing device of claim 14, wherein said computing device is a laptop computer.

16. The computing device of claim 14, wherein at least a portion of said one or more light pipes is embedded within said webbed structure.

17. The computing device of claim 14, wherein at least one of said keycaps includes a legend thereon, wherein said legend is adapted to be backlit by light delivered from said one or more light pipes.

18. The computing device of claim 17, wherein said at least one keycap includes a top surface and one or more side walls extending downward therefrom to define a hollow inner region beneath the keycap, wherein said top surface and one or more side walls are substantially opaque with the exception of said legend, and wherein at least one of said light pipes backlights said legend by delivering light to shine therethrough.

19. The computing device of claim 18, wherein at least a bottom portion of one sidewall is transparent or translucent, and wherein light to backlight said legend is delivered through said transparent or translucent portion into the hollow inner region.

20. The computing device of claim 14, wherein said webbed structure is formed from a light transmitting material, and wherein said one or more light pipes are integrally formed within said light transmitting material.

21. A method of illuminating keys on a keyboard, comprising:
    arranging a light source along one or more sides of and within the same plane as a plurality of keys arranged in a pattern, wherein each of said plurality of keys includes a keycap and an actuating component;
    extending one or more light pipes from said light source and between at least some of said plurality of keys, wherein said one or more light pipes do not run beneath any of said plurality of keys;

delivering light from said light source through said one or more light pipes to said plurality of keys; and illuminating said plurality of keys with the delivered light.

22. The method of claim 21, wherein at least one of said keycaps includes a legend thereon, a top surface and one or more side walls extending downward therefrom to define a hollow inner region beneath the keycap, wherein said top surface and one or more side walls are substantially opaque with the exception of said legend, and wherein said illuminating step includes shining the delivered light through said legend in a backlighting manner.

23. The method of claim 22, further including the step of:
forwarding at least a portion of said delivered light beneath one of the side walls into the hollow inner region.

24. The method of claim 22, wherein at least a bottom portion of one sidewall is transparent or translucent, and further including the step of:
forwarding at least a portion of said delivered light through said transparent or translucent portion into the hollow inner region.

25. The method of claim 21, wherein said light pipes are embedded within a webbed structure that surrounds said keys and defines openings for each of said plurality of keys.

26. The method of claim 25, wherein the openings in said webbed structure are larger than the respective keys such that gaps exist between the webbed structure and the plurality of keys, and wherein said illuminating step includes shining light upward through said gaps to illuminate the keys.

* * * * *